United States Patent [19]

Diffenderfer

[11] 4,154,065

[45] May 15, 1979

[54] UNIVERSAL JOINT PIVOT ASSEMBLY

[75] Inventor: Harold R. Diffenderfer, Pottstown, Pa.

[73] Assignee: Neapco, Inc., Pottstown, Pa.

[21] Appl. No.: 822,352

[22] Filed: Aug. 5, 1977

[51] Int. Cl.² ............................ F16D 3/41; F16D 3/26
[52] U.S. Cl. ........................................................ 64/17 A
[58] Field of Search ............................... 64/17 R, 17 A

[56] References Cited

U.S. PATENT DOCUMENTS

| | | | |
|---|---|---|---|
| 2,217,082 | 10/1940 | Swenson | 64/17 R |
| 2,802,351 | 8/1957 | Anderson | 64/17 A |
| 3,070,980 | 9/1963 | Slaght | 64/17 A |
| 3,187,907 | 4/1965 | Lyons | 64/17 A |
| 3,218,692 | 11/1965 | Kayser | 64/17 A |
| 3,470,711 | 10/1968 | Kayser | 64/17 A |
| 3,721,110 | 3/1973 | Borneman | 64/17 A |
| 4,050,130 | 9/1977 | Pitner | 64/17 A |
| 4,067,626 | 1/1978 | McElwalh | 64/17 A |

FOREIGN PATENT DOCUMENTS

| | | | |
|---|---|---|---|
| 1290006 | 9/1972 | United Kingdom | 64/17 A |
| 1477910 | 6/1977 | United Kingdom | 64/17 A |
| 475465 | 10/1975 | U.S.S.R. | 64/17 A |

Primary Examiner—Samuel Scott
Assistant Examiner—R. C. Turner
Attorney, Agent, or Firm—Woodcock, Washburn, Kurtz & Mackiewicz

[57] ABSTRACT

A universal joint pivot assembly exhibiting extended life and capable of being inexpensively manufactured. Bushings for receiving trunnion journals are provided with a plurality of upstanding bosses formed by a cold forging process. The boss surfaces are inclined to generate a conical surface, and the ends of the journals are formed at a matching angle. In a preferred embodiment the bosses are comprised by ridges which terminate short of the center of the bushing to form a cavity for receiving an unmachined protrusion at the journal center.

10 Claims, 7 Drawing Figures

UNIVERSAL JOINT PIVOT ASSEMBLY

BACKGROUND OF THE INVENTION

The present invention relates to universal joints, and more particularly to an improved journal and bushing design.

Universal joints of various types have been known since antiquity, and take many forms. Perhaps the most widely-used form of universal joint is the cross-type or Hooke's joint which is in common usage for Hotchkiss drive vehicles, and is further used for industrial drives, power takeoffs, and the like. This form of universal joint ordinarily comprises a pair of U-shaped yokes, one on a driving shaft and one upon the driven shaft. A cross-shaped trunnion having four journals, usually oriented 90° apart, is used to couple the yokes. Each yoke receives a pair of opposed journals in appropriate bearings, bushings, or the like.

Ordinarily the journals of the trunnion are received in cup-shaped bushings. The sides of the journals may bear directly upon the walls of the bushing, in the manner of a plain bearing. Needle bearings or sleeves of a dissimilar material may be used to further decrease the friction between the journal and the bushing. The bushings are located in their respective yokes by means of clamps, interference fits, C-shaped spring washers, welding or other appropriate means.

Under some conditions of operation, substantial end thrust is generated whereby the axial ends of the journals bear against the inner surfaces of the bushing ends. While end thrust is ordinarily not great, under some circumstances it is sufficient to cause galling and/or heating of the journal surfaces. The heating is detrimental to the entire bearing system inasmuch as it may destroy lubricant retained within the bushing, and in extreme cases can soften or draw the temper from the hardened surfaces of the journal or bushing. Bits of metal which have been abraded from the thus-deteriorated bearing system further accelerate the wear and degeneration of the universal joint and the joint soon fails.

Although this problem has been recognized for some time and efforts made to overcome it, to date no simple, inexpensive design has been advanced. Some replacement-type universal joint trunnions for automobiles and light trucks have been provided with axial passages through which grease can be pumped to the bearings. Alternatively, thrust members of hardened steel, bronze or glass-filled nylon have been disposed between the ends of trunnion journals and the bottoms of the bushings which receive them. Both of these approaches, however, necessitate additional machining and/or parts and thus add to the complexity and expense of the universal joint assembly. It will therefore be appreciated that it would be highly beneficial to produce an inexpensive universal joint assembly which exhibits superior resistance to deterioration resulting from the end thrust of trunnion journals.

It is therefore an object of the present invention to provide a universal joint assembly which is capable of withstanding greater end thrust than previous designs of comparable cost and simplicity.

Another object of the invention is to provide a method for forming an improved universal joint pivot assembly.

Another object is to provide an enclosed trunnion bearing which retains sufficient lubricant to last for its anticipated service life.

SUMMARY OF THE INVENTION

Briefly stated, in accordance with one aspect of the invention the foregoing objects are achieved by providing a trunnion having two or more journals, the journals having cylindrical lateral surfaces and generally conical end surfaces. The bushing which receives each journal is provided with a plurality of upstanding bosses upon its inner end surface, the surfaces of the bosses being inclined to generate a conical surface which matches that of the end of the journal. In a preferred embodiment, the bosses comprise ridges which stop short of the center of the bushing to form a depression for receiving a projection left at the center of the journal after machining. In an alternate embodiment, the bottom surface of the bushing may be a plain conical surface, the raised bosses being disposed upon the end surface of the trunnion journals. Improved bearing characteristics are achieved by roughening the journal surfaces after machining, and then hardening the roughened surfaces.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

DESCRIPTION OF A PREFERRED EMBODIMENT

Figure 1:
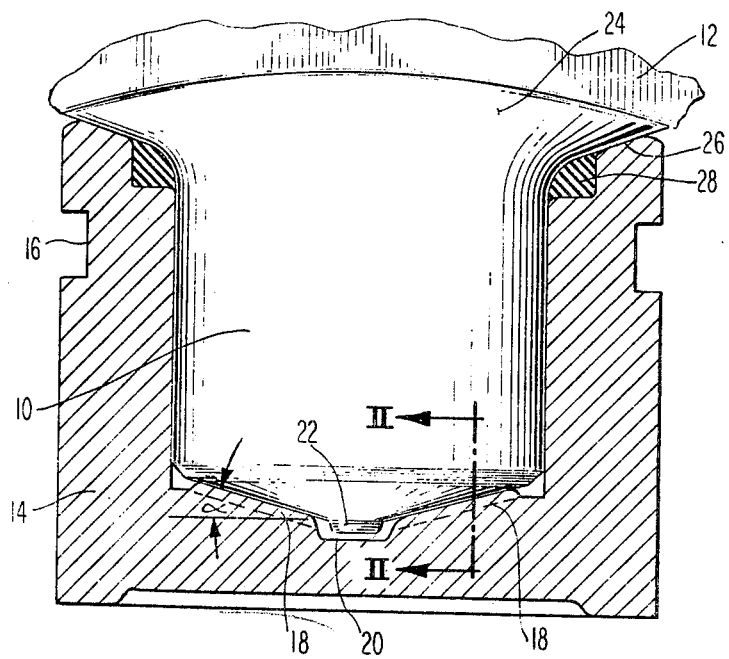
FIG. 1 is a partly sectioned illustration of a universal joint pivot assembly.

FIG. 1 represents the journaled end of a trunnion 12 (partly broken away) received in a bushing 14. The bushing is shown in sectional form to facilitate illustration of various details of the invention. As is conventional, the bushing is generally cup-shaped in form, and is provided with a peripheral groove 16 for receiving a C-ring or the like to retain the bushing in a differential joint yoke. The lateral, inner surfaces of the bushing are cylindrical in form and slidingly receive the lateral cylindrical surfaces of journal 10 with apropriate clearance to allow for proper lubrication of the parts when in motion. Alternatively, needle or roller bearings can be disposed between the journal surface and surrounding bushing wall.

Figure 2:
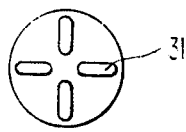
FIG. 2 is a view taken at II—II of FIG. 1.

At the lower end of the bushing are disposed a plurality of upstanding bosses 18. In the illustrated embodiment, the bosses take the form of generally radially-extending ridges. As is evident from FIG. 2, the ridges are crowned or radiused and so present only line contact against the end of journal 10. The ridges are inclined at an angle $\alpha$ and extend generally radially outwardly from the center of the bushing. In a preferred embodiment the ridges do not extend completely to the center, but rather terminate to form a centrally-located depression 20.

The end of journal 10 is beveled to form a conical surface lying at an angle α to a plane perpendicular to the axis of the journal so that it mates with the upper surfaces of ridges 18. It has been discovered that as the angle of deflection of the universal joint increases the nature of the end thrust between the journal ends and bushing changes, so that different areas of the end of a conventional bushing are contacted by the journal end. The present angled bottom surfaces, however, operate somewhat in the manner of a spherical bearing to accommodate some of the misalignment. Occasional loss of contact between the journal end and certain of the ridges 18 is not detrimental to the system, however, and in fact is helpful inasmuch as it allows lubricant lying between the ridges to flow over the ridge surfaces. Accordingly, intermittent deflection of the universal joint actually facilitates the lubrication of the journal end.

Still another benefit flowing from the illustrated construction is the fact that the end of the bushing easily accommodates a protrusion 22 upstanding from the center of the journal end. The ends of the journals may be faced at the proper angle either by turning, or by plunging with an appropriately-angled cutter. When the journal end is faced off, unless the turning tool is precisely positioned a small protrusion may occur at the journal center, requiring a second operation for its removal. When facing of the journal is done by a plunging operation, the relatively low surface speed of the material near the center of the journal makes it difficult to remove in one step; hence, it is highly advantageous from a manufacturing standpoint to be able to leave a centrally-located unmachined protrusion on the journal.

At the opposite axial end of the journal a second, generally conical surface 24 is formed. This surface, which may alternatively be convex or concave, forms a transition zone between the rough forged surface of the trunnion and the machined journal. By providing a mating surface 26 about the mouth of the bushing, and disposing a circular seal 28 in a groove formed therein, superior sealing action is achieved. In particular, the close proximity of surfaces 24 and 26 serves to prevent foreign matter such as dust, bits of vegetation, etc. from working their way into contact with seal 28 and injuring the latter. The seal may be of any appropriate type such as a rubber or neoprene O-ring, a cork ring, or a member of various combinations of cork and rubber. Other types of seals may be provided as appropriate.

The manner of forming the bosses at the bottom of the bushing is also of considerable importance, inasmuch as it allows the invention to be practiced in an extremely economical manner. In particular, the inventor has found that the bosses can be easily formed through a cold-forming process using a punch having indentations in the end face thereof. As the punch is forced downwardly against the end of the bushing, the metal thereof cold-flows and adopts the shape of the punch end. Appropriate indentations can be easily formed in the punch end so that various configurations of bosses may be formed, as desired. Accordingly, the number, shape and cross-section of the bosses may easily be varied along with their general orientation. In this connection it will be recognized that while the depicted ridges are generally described as being "radial", they may depart from a strict radial orientation but continue to function in the desired manner. Accordingly, the term "radial" is used herein to describe ridges which extend from a radially inner to a radially outer point with respect to the axis of a bushing or journal. In addition, many other configurations of upstanding bosses may be selected. The precise shape of the bosses is not believed critical to a successful implementation of the invention and various configurations may be selected, although it is thought that the contact areas thereof should be radiused and smooth.

Figure 3:
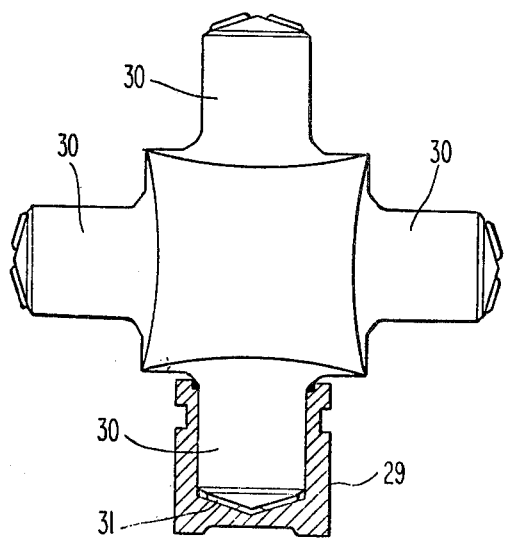
FIG. 3 represents the trunnion of a universal joint formed according to principles of the present invention.

Turning now to FIG. 3 there is shown a typical cross-type trunnion which includes four journals spaced at 90° intervals. Depending upon the type of joint, the various journals may or may not lie in a common plane. The bottom of a bushing 29 defines an uninterrupted conical surface, while the axial end surfaces of the journals 28 are provided with a plurality of upstanding ridges 31. The ridges operate as described hereinabove to provide multiple line contact between the journal and bushing ends and further to enhance lubrication of the relatively moving surfaces.

The relieved areas defined between the upstanding bosses serve as reservoirs for retaining a quantity of lubricant.

The angle of the conical surfaces generated by the ridges and formed by the bottom of the bushing is preferably aproximately 5° with respect to a plane perpendicular to their common axis. It is believed that the beneficial results of the use of conical mating surfaces extend over the range of from 3° to 15°, however, although it is possible that under certain circumstances other angles beyond this range may produce satisfactory results. As the present invention may be used with various angular arrangements, it is not intended that the scope of the invention be limited to any particular range of angles including those which are illustrated in a preferred embodiment.

Figure 4A:
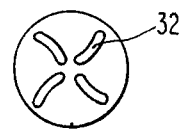
FIGS. 4a–4d are end views of the bushing of FIG. 1, illustrating different embodiments of the invention.
Figure 4B:
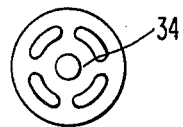
Figure 4C:
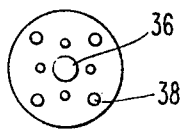
Figure 4D:
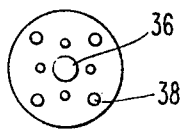

FIGS. 4a–4d represent end views of alternate embodiments of bushing 14. In FIG. 4a ridges 31 lie along true radial lines extending from the axial center of the bushing. It is believed that ridges of this type are most easily formed by means of conventional tooling. Other configurations, however, may be selected; one such variation is illustrated in FIG. 4b wherein radial ridges 32 are arranged along lines tangent to a circle smaller than the diameter of the journal. As shown, the ridges may also be curved in the manner of a spiral. In FIG. 4c the bosses are arranged in arcs generally concentric with the center of the bushing. Also, a centrally-located recess 34 is provided for receiving the protrusion 22 which may occur at the center of the journal end, as described above. FIG. 4d also illustrates a similar recess 36, which is necessary when the height of the journal protrusion exceeds the height of the bosses or ridges. As in FIG. 4c, the bosses of FIG. 4d are not radially oriented. Bosses 38 are generally round in plan view, and produce point rather than line contact upon the cooperating journal end surface. Nonetheless, by providing enough bosses the loading is distributed sufficiently to produce the desired result; and as set forth above an occasional "rocking" of the journal end surface, due to joint deflection, will allow lubricant lying among the bosses to flow over them and lubricate the mating surfaces.

It will be evident that many such variations in the nature of the bosses may be selected for various situations and it is considered within the purview of those skilled in the art, once the present invention is appreciated, to select boss configurations which are appropriate for a given application, and it will be appreciated that appropriate bosses can be formed either upon the journals or the bushing ends. As the term is used herein, the configurations termed "radially-extending" are considered to be so inasmuch as the ridges extend from a first point nearer the center of the journal to a second point near the edge thereof.

A further aspect of the present invention is the manner of treatment of the lateral surfaces of the trunnion journals. While it has been conventional to turn or grind journals to achieve a smooth, uniform finish the present inventor has found it advantageous to purposely roughen the smooth, machined finish by shot blasting. As is well known to workers in the art, shot blasting is a process by which a plurality of small particles are forcibly impelled against the surface of an article. The inventor has found that by shot blasting the lateral journal surfaces with hardened metal shot, preferably 60 to 150 sieve size, a slightly roughened surface can be produced to assist in the distribution and retention of lubricant upon the journal surface. With a presently preferred approach the journal is machined to the proper size, then shot blasted with hardened metal shot of the type described. The journals are then hardened, preferably by carburizing, to produce a hard, strippled surface which is not only receptive to lubricant but is resistive to wear. Other types of hardening processes, such as induction hardening, may alternatively be selected depending upon the type of materials used and other salient parameters and it should be understood that the scope of the invention is not limited by the specific hardening process, if any, which is used.

It will now be seen that the present invention constitutes an improved universal joint pivot assembly which is economical to manufacture, yet overcomes the difficult problems which have plagued universal joints for many years. Accordingly, and as will be evident from the foregoing description, certain aspects of the invention are not limited to the particular details of the examples illustrated and it is contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. A universal joint pivot assembly comprising:
    a trunnion having at least two journals, each of said journals having a generally cylindrical lateral surface and a first end surface;
    at least two bushings for rotatably receiving said journals, said bushings each defining a cylindrical bearing surface and a second end surface;
    a plurality of upstanding rounded bosses disposed upon one of said first or second end surfaces and defining a generally conical bearing surface lying at an angle $\alpha$ with a plane perpendicular to the axis of the adjacent cylindrical surface; and
    the other of said first or second end surfaces being generally conical in form and lying at substantially the same angle $\alpha$ with a plane perpendicular to the axis of its respective adjacent cylindrical surface.

2. A universal joint pivot assembly according to claim 1, wherein said bosses comprise a generally convex surface.

3. A universal joint pivot assembly according to claim 2, wherein said bosses are upstanding from the end surfaces of said bushings.

4. A universal joint pivot assembly according to claim 3, wherein said angle $\alpha$ lies in the range of from 3° to 15°.

5. A universal joint pivot assembly according to claim 4, wherein said bushings each include a centrally-located depression to provide clearance for a protrusion of a journal received in said bushings.

6. An improved universal joint pivot assembly, comprising:
    a trunnion having four journals oriented substantially 90° apart to form a cross, said journals having cylindrical lateral surfaces and first end surfaces;
    four bushings each defining a cylindrical bearing surface for receiving ones of said journals therein, and a second end surface for confronting said first end surfaces; and
    a plurality of rounded bosses intergral with and projecting from ones of said end surfaces for bearing against the others of said end surfaces;
    and wherein said bosses comprise generally symmetrically radially disposed ridges terminating at inner ends lying at some distance from the center of said end surfaces.

7. An assembly according to claim 6, wherein said bosses project from said second end surfaces.

8. An assembly according to claim 7, wherein said bosses define a conical surface and said first end surfaces each define a mating, conical surface.

9. An assembly according to claim 8, further including generally cylindrical protrusions disposed at the center of said first end surfaces and upstanding therefrom; and a cavity for receiving said protrusions.

10. An assembly according to claim 9, wherein said trunnion and said bushings further include mating conical surfaces disposed adjacent said cylindrical surfaces and at the opposite axial end thereof from said first and second end surfaces; and a groove formed in said bushing adjacent the conical surface thereof for receiving a circular seal member.

* * * * *